(12) United States Patent
Clausen et al.

(10) Patent No.: US 9,031,314 B2
(45) Date of Patent: May 12, 2015

(54) ESTABLISHING COORDINATE SYSTEMS FOR MEASUREMENT

(75) Inventors: Paul David Clausen, Waterloo (CA); James Spere, Kitchener (CA); Terry Harold Fisher, Waterloo (CA)

(73) Assignee: Northern Digital Inc., Waterloo, Ontario (CA)

(*) Notice: Subject to any disclaimer, the term of this patent is extended or adjusted under 35 U.S.C. 154(b) by 841 days.

(21) Appl. No.: 13/099,548

(22) Filed: May 3, 2011

(65) Prior Publication Data

US 2011/0268322 A1    Nov. 3, 2011

Related U.S. Application Data

(60) Provisional application No. 61/330,708, filed on May 3, 2010.

(51) Int. Cl.
*G06K 9/00* (2006.01)
*G06T 7/00* (2006.01)
*G01B 11/25* (2006.01)

(52) U.S. Cl.
CPC .............. *G06T 7/0042* (2013.01); *G01B 11/25* (2013.01); *G06T 2207/30108* (2013.01)

(58) Field of Classification Search
None
See application file for complete search history.

(56) References Cited

U.S. PATENT DOCUMENTS

| | | | |
|---|---|---|---|
| 4,645,348 A | 2/1987 | Dewar et al. | |
| 5,661,667 A | 8/1997 | Rueb et al. | |
| 6,101,455 A | 8/2000 | Davis | |
| 6,246,468 B1 | 6/2001 | Dimsdale | |
| 6,508,403 B2 | 1/2003 | Arsenault et al. | |
| 7,487,063 B2 | 2/2009 | Tubic et al. | |
| 7,693,325 B2* | 4/2010 | Pulla et al. | 382/154 |
| 7,912,673 B2 | 3/2011 | Hébert et al. | |
| 8,294,082 B2* | 10/2012 | Melkis et al. | 250/227.2 |
| 2004/0251866 A1* | 12/2004 | Gan et al. | 318/568.11 |
| 2008/0201101 A1 | 8/2008 | Hebert et al. | |

OTHER PUBLICATIONS

Hebert, "A Self-Referenced Hand-Held Range Sensor", Proceedings of the Third International Conference on 3-D Digital Imaging and Modeling (3DIM '01) 2001.

* cited by examiner

*Primary Examiner* — Sumati Lefkowitz
*Assistant Examiner* — David Perlman
(74) *Attorney, Agent, or Firm* — Fish & Richardson P.C.

(57) ABSTRACT

In one aspect, in general, a measurement system includes a projector for illuminating a pattern on a surface of the object, at least two imaging devices for obtaining images of a portion of an object, wherein at least some of the images include representations of one or more illuminated reference markers, an instrument for identifying a predetermined feature of the object, and a computing device for determining first position information associated with the illuminated reference markers represented in the images, determining second position information associated with the instrument, and based on the first position information and the second position information, assigning a predetermined coordinate system of the object to the object.

25 Claims, 6 Drawing Sheets

ESTABLISHING COORDINATE SYSTEMS FOR MEASUREMENT

PRIORITY CLAIM

This application claims the benefit of U.S. Provisional Application No. 61/330,708, filed May 3, 2010, the contents of which are hereby incorporated by reference in their entirety.

BACKGROUND

This description relates to establishing coordinate systems for measuring objects.

To detect deformations and other types of manufacturing errors, parts are often inspected prior to being delivered and used for their intended purposes. Upon detection, parts deemed to have failed inspection may be identified for appropriate action (e.g., providing the defective part to a stage for corrective action, discard the part, etc.). For such inspections, information collected from each part may be compared to one or more predefined standards or requirements to determine if a deformation or other type of abnormality is present.

SUMMARY

In one aspect, in general, a measurement system includes a projector for illuminating a pattern on a surface of an object, at least two imaging devices for obtaining images of a portion of the object, wherein at least some of the images include representations of one or more illuminated reference markers, an instrument for identifying a predetermined feature of the object, and a computing device for determining first position information associated with the illuminated reference markers represented in the images, determining second position information associated with the instrument, and based on the first position information and the second position information, assigning a predetermined coordinate system of the object to the object.

Implementations of this aspect can include one or more of the following features. The instrument includes a tactile probe attachment for measuring an offset for establishing reference points. The instrument includes a tactile probe that includes reference markers. At least some of the images include representations of the reference markers of the tactile probe. The instrument includes a directed light source for illuminating a surface of the object. The directed light source comprises a laser.

In another aspect, in general, a measurement method includes illuminating a pattern on a surface of an object, obtaining images of a portion of the object, wherein at least some of the images include representations of one or more illuminated reference markers, identifying a predetermined feature of the object, determining first position information associated with the illuminated reference markers represented in the images, determining second position information associated with the predetermined feature, and based on the first position information and the second position information, assigning a predetermined coordinate system of the object to the object.

Implementations of this aspect can include one or more of the following features. The method also includes using the images to generate a computer model of the object based on a measured profile of the object. The method also includes comparing the computer model to a reference model representing a version of the object. At least one image includes the reference markers and at least one image is absent the reference markers. At least one image includes the reference markers and includes the illuminated pattern. The method also includes determining the second position information when an instrument is placed at the predetermined feature. The method also includes identifying an origin for the predetermined coordinate system of the object, the origin based on a location of the predetermined feature of the object.

In another aspect, in general, a computer program product residing on a computer readable medium includes instructions for causing a machine to illuminate a pattern on a surface of an object, obtain images of a portion of the object, wherein at least some of the images include representations of one or more illuminated reference markers, identify a predetermined feature of the object, determine first position information associated with the illuminated reference markers represented in the images, determine second position information associated with the predetermined feature and based on the first position information and the second position information, assign a predetermined coordinate system of the object to the object.

Implementations of this aspect can include one or more of the following features. The computer program product includes instructions for causing a machine to use the images to generate a computer model of the object based on a measured profile of the object. The computer program product includes instructions for causing a machine to compare the computer model to a reference model representing a version of the object. At least one image includes the reference markers and at least one image is absent the reference markers. At least one image includes the reference markers and includes the illuminated pattern. The computer program product includes instructions for causing a machine to determine the second position information when an instrument is placed at the predetermined feature. The computer program product includes instructions for causing a machine to identify an origin for the predetermined coordinate system of the object, the origin based on a location of the predetermined feature of the object.

These and other aspects and features and various combinations of them may be expressed as methods, apparatus, systems, means for performing functions, program products, and in other ways.

Other features and advantages will be apparent from the description and the claims.

DETAILED DESCRIPTION

This disclosure relates to establishing coordinate systems for testing objects such as manufactured parts. While various testing systems may use these techniques for establishing coordinate systems, for demonstrative purposes, a multimode optical measurement system is used to measure, for example, shape, profile, and deformation. Coordinate systems can be three-dimensional (3-D).

A 3-D coordinate system measures coordinates on three axes (e.g., an x-axis, a y-axis, and a z-axis). Each coordinate defined within the coordinate system is an indication of a position on each axis. For example, a measurement system can determine 3-D coordinates for a physical object by measuring the object and plotting the coordinates based on the measurement.

The origin of the coordinate system (e.g., point "zero" on each axis) can be defined as a fixed point that is a position relative to the measurement system. For example, the origin of the coordinate system can be defined to be a position a few meters away from the measurement system that is the position the measurement system begins measuring from. In this example, the axes of the coordinate system emanate from the fixed point. This kind of measurement system is referred to as a local coordinate system.

The origin of the coordinate system can also be defined as a position relative to a physical object being measured by the measurement system. For example, during measurement of the object, the origin of the coordinate system can be defined to be a fixed point on the object. In this example, the axes of the coordinate system emanate from the fixed point on the object in directions that depend on the orientation of the object, and the axes may be oriented differently than axes of a local coordinate system of the measurement system. This kind of measurement system is referred to as a fixed coordinate system. Coordinates of an object defined according to a fixed coordinate system do not change when the object changes position or orientation. In contrast, coordinates of an object defined according to a local coordinate system depend on the object's position and orientation relative to the measurement system.

A fixed coordinate system can be transformed into a coordinate system having an origin that is aligned to correspond to a different, predetermined position on the object. The coordinate system may be re-aligned in this manner so that the coordinate system used for the object, when measured, corresponds to coordinate systems associated with other representations of the object. One such representation of the object may be a computer model that is associated with its own pre-existing coordinate system including a different, pre-existing origin at a particular position on the object. In this manner, the origin of coordinate systems used for the object remains consistent among representations of the object, including the object as measured by the measurement system. The measured object can then be compared to the other representations of the object. For example, when the same coordinate system and origin is used for all representations of the object, a location identified by coordinates on the object can be compared to the same location identified by the same coordinates on the other representations of the object (e.g., the computer model of the object).

A coordinate system of the object that has been re-aligned so that its origin corresponds to a predetermined point on the object is referred to as a predetermined coordinate system of the object. The measurement system can determine coordinates of an object defined in a predetermined coordinate system of the object. For example, the measurement system can be provided information about the object that allows the measurement system to determine where the origin of the coordinate system should be defined (e.g., which point on the object should be the origin), and transformed from a fixed coordinate system used during measurement into the predetermined coordinate system of the object. The predetermined coordinate system of the object may also have axes that are oriented differently than axes of the fixed coordinate system of the object measured by the measurement system.

Figure 1:
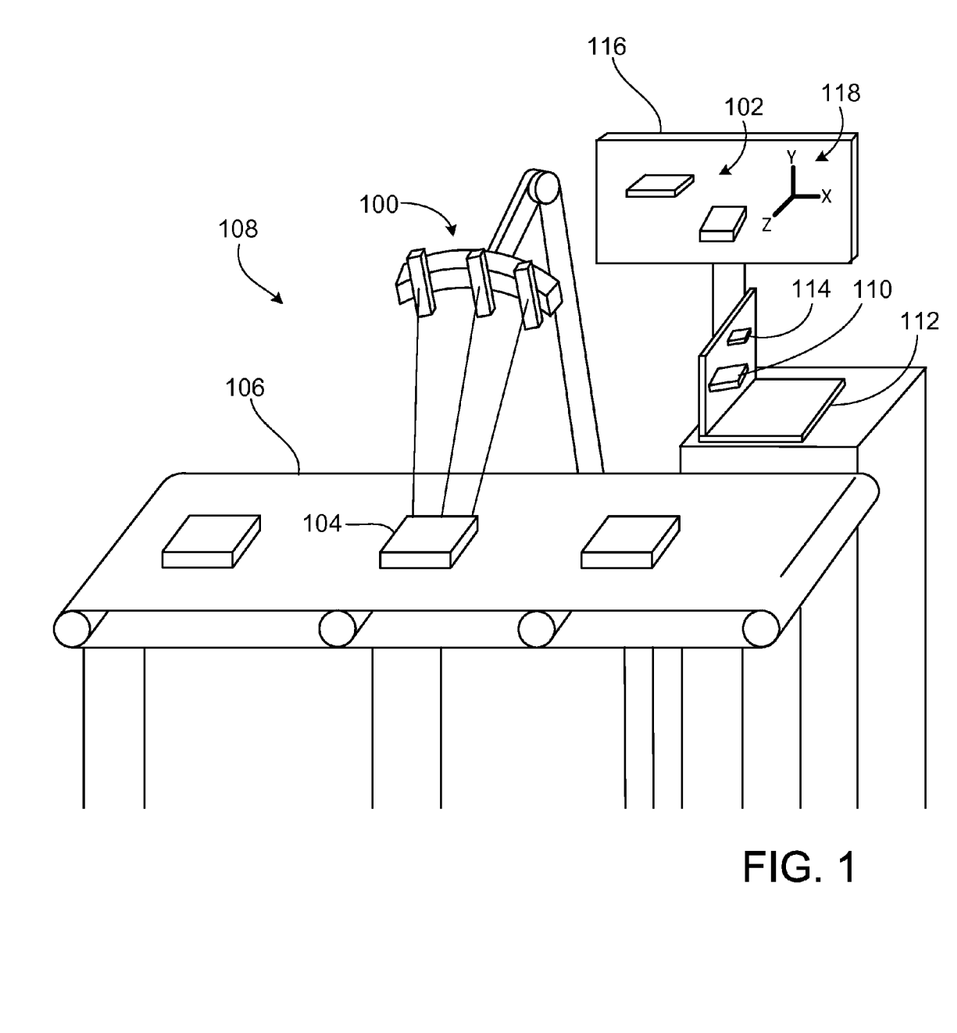
FIG. 1 is a view of a self-referencing 3-D laser scanner in a manufacturing plant.

Referring to FIG. 1, a self-referencing 3-D laser scanner 100 acquires images 102 (shown here on a display 116) of objects 104 such as physical objects (e.g., manufactured parts) on an operating surface 106 in a factory 108. The images 102 acquired by the 3-D laser scanner 100 can be used to measure aspects of the object 104. For example, the images 102 can be used to determine whether the object 104 conforms to specifications for that type of object. In some implementations, the object 104 may have specifications such as standards that it is designed to adhere to, for example, a standard size and shape. The object 104 may also have tolerances that it is designed to adhere to, for example, tolerances that define a range for the object's dimensions, surface roughness, color, or other types of physical attributes.

The 3-D laser scanner 100 is here shown mounted on a robotic arm 120 that moves (as indicated by an arrow 122) into position to scan the object 104. In some implementations, the 3-D laser scanner 100 is a hand-held device.

In some implementations, the images 102 acquired by the 3-D laser scanner 100 can be used to determine whether the object 104 conforms to specifications for that type of object by generating a 3-D model 110 of the object 104. The 3-D model 110 is shown in the figure as a rendering on a computer screen. The 3-D model 110 can be generated from images 102 of the object 104 captured by the 3-D laser scanner 100. The images 102 may represent portions of the object 104 or features of the object 104, for example. In some implementations, a computer system 112 in communication with the 3-D laser scanner 100 can receive the images 102 captured by the 3-D laser scanner 100 and generate the 3-D model 110. In some implementations, the 3-D model 110 is a collection of 3-D points, sometimes referred to as a 3-D point cloud. The 3-D model 110 could also take other forms such as a vector model, polygon model, a CAD model, a CNC (computer numerical control) model, or another kind of model represented by data usable by a computer system or digital system.

The images 102 are measured using a local coordinate system of the 3-D laser scanner 100 (here represented as 3-D axes 118 shown on the display 116). When the computer system 112 generates a 3-D model 110 of the object 104, the computer system 112 assigns a predetermined coordinate system for the object 104 to the 3-D model 110. The predetermined coordinate system for the object 104 is independent of the local coordinate system of the 3-D laser scanner 100. In some implementations, a fixed coordinate system is generated for the object 104 when the object 104 is measured. The fixed coordinate system may have an origin and axes that do not correspond to an origin and axes of the predetermined coordinate system. The 3-D laser scanner 100 or the computer system 112 can transform the fixed coordinate system into the predetermined coordinate system of the object.

In some implementations, the computer system 112 controls the 3-D laser scanner 100. The computer system 112 and 3-D laser scanner 100 together or in association with other components can make up a self-referencing 3-D measurement system. Different combinations of the 3-D laser scanner 100 and the computer system 112 can be used to perform processing steps. In some implementations, the 3-D laser scanner 100 includes a processor and can perform processing steps related to calculating coordinates or coordinate systems or related to generating computer models of an object. In some implementations, the 3-D laser scanner 100 may perform some processing steps and a computer system 112 may perform other processing steps. In some implementations, other computing devices having processors may perform some processing steps related to calculating coordinates or coordinate systems or related to generating computer models of an object, while either or both of the 3-D laser scanner 100 and the computer system 112 perform other processing steps. In some implementations, a computer system 112 is not used, and the 3-D laser scanner 100 includes processing components that allow it to perform all processing steps related to calculating coordinates or coordinate systems or related to generating computer models of an object.

In some implementations, the 3-D model 110 can be compared to a reference model 114 available on the computer system 112. For example, the reference model 114 can be a model of an object that complies with specifications, such as standards and tolerances, for that type of object. The computer system 112 can compare the 3-D model 110 to the reference model 114 to determine if the 3-D model 110 differs from the reference model 114. If the computer system 112 identifies a difference, the computer system 112 can determine the degree to which the 3-D model 110 varies from the reference model 114. If the computer system 112 determines that the 3-D model 110 varies from the reference model 114 to a degree that is acceptable within specified tolerances or standards for the object 104, the computer system 112 can identify the object 104 as acceptable. If the computer system 112 determines that the 3-D model 110 varies from the reference model 114 to a degree that is not acceptable within specified tolerances or standards for the object 104, the computer system 112 can identify the object 104 as not acceptable. In the latter case, the object 104 may be removed from the operating surface 106 for repair, adjustment, or disposal, for example. In some implementations, the computer system 112 can use information about the difference between the 3-D model 110 and the reference model 114 to provide instructions describing how to repair or adjust the object 104. For example, the computer system 112 may provide instructions to a machine or other facility in the factory 108 that is capable of repairing or adjusting the object.

In some implementations, the 3-D laser scanner 100 and computer system 112 can be used to generate the reference model 114 at some period in time prior to viewing and measuring other models. For example, the object 104 might be an object known to comply with specifications, such as standards and tolerances, for that type of object.

In some implementations, the 3-D model 110 can be used in the factory 108 to generate other object based on the 3-D model 110. For example, information about the 3-D model 110 can be provided to a machine or other facility in the factory 108 capable of producing copies of the object 104 based on 3-D model information. For example, the 3-D model 110 can be provided to a manufacturing robot, a CNC machine, a 3-D printer, or another kind of manufacturing device.

In some implementations, the 3-D laser scanner 100 and computer system 112 are used in a facility other than a factory 108. For example, the 3-D laser scanner 100 and computer system 112 can be used in a repair facility, and the 3-D model 110 generated by the computer system 112 can be used to identify damage in an object 104 so that the damage can be corrected or repaired.

In some implementations, the 3-D laser scanner 100 scans different instances 104a, 104b of the object 104 such that the objects 104, 104a, 104b are all aligned or oriented differently with respect to each other. The 3-D laser scanner 100 can use techniques to establish a predetermined coordinate system that is used for each object 104, 104a, 104b, even if the objects 104, 104a, 104b are each aligned differently during scanning and measurement. In this manner, the origin of the coordinate system remains consistent among instances 104, 104a, 104b of the object.

Figure 2:
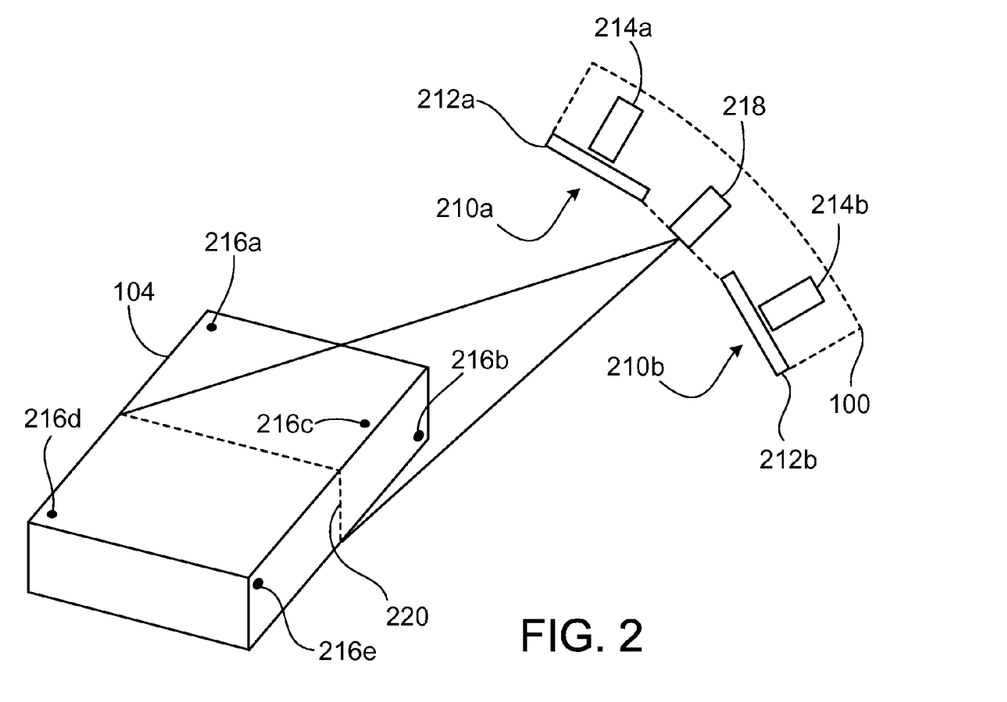
FIG. 2 is a schematic diagram of a self-referencing 3-D laser scanner.

Referring to FIG. 2, a self-referencing 3-D laser scanner 100 can use two or more cameras 210a, 210b (that each include a lens 212a, 212b and an image collector 214a, 214b) to view an object 104 and reference markers 216a-e positioned in a predefined known relationship to the object 104 (e.g. positioned as a predefined known pattern). The reference markers 216a-e are identified in the images, and their 2D location in the image is computed. Since the location of the image collectors in the local coordinate system of the self-referencing 3-D laser scanner are known, the 3-D position of the markers can be computed. Using information from at least 3 reference markers, the self-referencing 3-D laser scanner (or computer) can compute its current position and orientation relative to the fixed coordinate system. In this example, the reference markers 216a-e each have a known location relative to each other, and this information can be used by the 3-D laser scanner 100 to determine the position and orientation of the object 104 based on information about the known positions and locations of the reference markers 216a-e (e.g., as provided to the 3-D laser scanner 100 or associated computer system prior to collecting images of the object 104).

The 3-D laser scanner 100 may include a laser projector 218 to illuminate a pattern 220 on the surface of the object 104. In one arrangement, one or more of the cameras are used to acquire images of the object 104 (e.g., images 102 shown in FIG. 1), and the pattern 220 illuminated by the laser projector 218, to determine a profile of the object along the illuminated pattern. The profile information may be combined with the relative movement information to form a 3-D model (e.g., a 3-D model defined based on a 3-D point cloud of coordinates) of the object 104. For example, the 3-D model could be the 3-D model 110 shown in FIG. 1. Once produced, the 3-D model can be used for a variety of applications including generating a 3-D view of the object 104, for example, on the computer system, and comparing the 3-D model to a reference model such as the reference model 114 shown in FIG. 1.

In some implementations, the 3-D laser scanner 100 obtains images that include the reference markers 216a-e, and obtains other images absent the reference markers 216a-e. For example, the images obtained when the laser projector 218 illuminates a pattern 220 on the surface of the object 104 may not include the reference markers 216a-e. The images that include the reference markers 216a-e may be obtained using light outside of the range visible to the human eye, e.g., infrared light. The use of light in this range may be desirable in certain environments, e.g., in environments in which flicker of visible light during imaging could be a distraction to human workers. In some implementations, the 3-D laser scanner 100 obtains images that include both the reference markers 216a-e and the illuminated pattern 220.

As illustrated in FIG. 2, a 3-D laser scanner 100 may be used to create 3-D models of the physical object 104. Such 3-D model data may be used to create computer models of physical objects such as the 3-D model 110 shown in FIG. 1 (e.g. for reverse engineering). Also, such 3-D model data may be used to compare a physical object to previously produced computer models such as the reference model 114 shown in FIG. 1 (e.g. for part inspection). Some conventional 3-D laser scanner systems rely on equipment such as a Portable Coordinate Measurement Machine (PCMM) to provide position and orientation information for assimilating the 3-D points measured by the laser scanner into a single coordinate system (typically the coordinate system of the PCMM). By using equipment such as a PCMM, the local coordinate system from data provided by the laser scanner may be aligned with a coordinate system of the object under test. For example, a probe connected to the PCMM may be used to measure points on the object for aligning the coordinate system provided by the PCMM with a predetermined coordinate system of the object.

Some 3-D laser scanner systems may incorporate techniques such that a PCMM or similar equipment may not be needed which can reduce the cost of the system.

Figure 3:
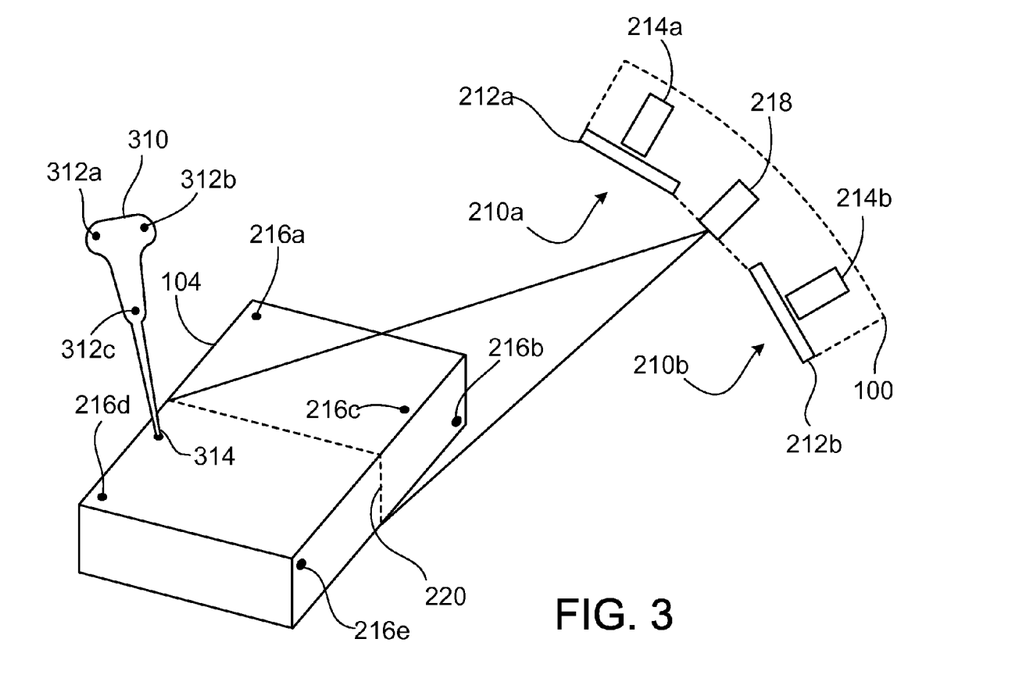
FIG. 3 is a schematic diagram of a self-referencing 3-D laser scanner and a tactile probe.

Referring to FIG. 3, for example, a 3-D laser scanner 100 may use retro-reflective reference markers to provide a self-referencing feature, and may not need a PCMM to provide position and orientation information associated with an object under test. To attain such information, the 3-D laser scanner 100 may observe the locations of reference markers 216a-e (e.g., retro-reflective markers), which have been placed in fixed relation to the object 104. In some instances, the reference markers 216a-e may be placed directly on the surface of the object 104 by using one or more attachment techniques (e.g., adhesives, direct insertion, etc.).

Sometimes the coordinate system established by a 3-D laser scanner is locally defined from collected information and not relative to the predetermined coordinate system of the object being measured. For example, a 3-D laser scanner may use a coordinate system defined locally to the 3-D laser scanner such as a coordinate system defined according to the space in which the 3-D laser scanner operates. As such, the 3-D laser scanner 100 may use a coordinate system that may not account for or be aligned with a predetermined coordinate system of the object 104. Even if the 3-D laser scanner 100 measures an object 104 by generating a fixed coordinate system for the object that is oriented relative to the object, the fixed coordinate system may vary among multiple versions of the same object. For example, the coordinate system defined by the scanner may depend upon the data collection setup (e.g., physical layout of the measurement) and the manner in which the data is collected from an object 104. For an example in which the object 104 is a statue, the 3-D laser scanner 100 may initiate scanning at a particular location of the statue (e.g., the feet or the head of the statue, etc.). As such, the origin of the coordinate system (as defined from the scanned data) may be fixed to a location that depends upon the initial data collection point (e.g., the origin located near the feet if scanning starts at the feet, the origin located near the head if scanning starts at the head), and thus can vary depending on how the object 104 is oriented for scanning.

By measuring specific points associated with the object under test, the 3-D laser scanner 100 can be adapted to align collected data associated with a local coordinate system (e.g., data collected from the reference markers 216a-e, data collected from an illuminated pattern, etc.) with a fixed coordinate system of the object 104. A coordinate system of the object 104 is a coordinate system oriented relative to the object rather than oriented relative to the 3-D laser scanner 100 or some other element of the self-referencing 3-D measurement system. As such, the local coordinate system of the 3-D laser scanner 100 may be adjusted to align with a fixed coordinate system of the object 104 that does not change even if the object 104 is moved or repositioned. Further, the fixed coordinate system of the object 104 can be adapted to correspond to a predetermined coordinate system of the object 104 that has an origin that is associated with a particular position or feature of the object 104 on every version of the object 104 measured by the 3-D laser scanner 100. In this manner, the origin of the coordinate system remains consistent among versions of the object 104. For example, the feature of the object could be a hole, slot, chamfer, or dimple, or another distinguishing feature.

In some implementations, the location of an instrument such as a probe 310 may be tracked as the instrument is positioned upon the surface of the object 104. Being separate from the reference markers 216a-e, the measured data from the probe 310 may be easily distinguishable from the data provided from the reference markers 216a-e. Upon being introduced to the object 104 (e.g., placed on a surface of the object), one or more of the measured positions of the instrument may be used for assigning a predetermined coordinate system to the object whose coordinates, axes, and origin does not depend on a position or orientation of the object. Instead, the predetermined coordinate system has coordinates, axes, and origin that are already based on other representations of the object, for example, an existing computer model of the object. For example, one position may be measured to identify or generate an origin for the object coordinate system. The origin for the predetermined coordinate system of the object would correspond to the particular measured position on the object even if the object were moved or changed orientation. By measuring multiple positions (e.g., locations, orientations, etc.) one or more axes of an object coordinate system may be defined (e.g., an x-axis, y-axis, and z-axis). To provide such measurements, various techniques may be implemented, for example, the probe 310 may be a tactile probe outfitted with retro-reflective markers 312a-c that may be tracked by the 3-D laser scanner 100 (e.g., in a manner similar to tracking the reference markers 216a-e). The position of the probe 310 is provided to a computing device such as computer system (e.g., the computer system 112 shown in FIG. 1). In some implementations, the orientation of the probe 310 is also provided to the computer system. Along with processing the scanned data associated with the reference markers 216a-e and the projected pattern 220, the computing device may process the data collected from the probe 310 for determining a coordinate system for the object 104, e.g., a predetermined coordinate system of the object 104. To collect data associated with the probe 310, one or more methodologies may be utilized. For example, a signal (e.g., initiated by the pressing of a button on the 3-D laser scanner 100 or the computer system 112) may trigger the computer system 112 to record the current position of the tip 314 of the probe 310. Along with collecting one position of the probe tip 314, additional position and orientation information regarding the probe tip 314 (e.g., upon moving the probe and pressing the button on the laser scanner or the computer system) may be collected. Once data collection is complete, the self-referencing coordinate system (e.g., provided from the reference markers 216a-e) may be aligned with the coordinate system information from the probe 310 to transform the data into the predetermined coordinate system of the object. Various processes and methodologies may be used for performing such alignment operations, for example, functions provided by a CAD (computer-aided design) package or similar software applications may be used.

Along with using retro-reflective markers, other type of similar markers and passive reflection techniques may be implemented. Active signaling techniques may also be used, separately or in combination with passive techniques, for example, active markers such as light emitting diodes (LEDs), lasers, or any other types of active devices may be used for visibly identifying a location point on the object 104. One or more methodologies may be implemented for tracking probes (such as the probe 310) relative to reference markers, for example, using retro-reflective markers, active markers, or other markers. For example, tracking techniques utilized by the Polaris Optical Tracking System produced by Northern Digital Inc of Waterloo, Ontario Canada may be implemented.

Figure 4:
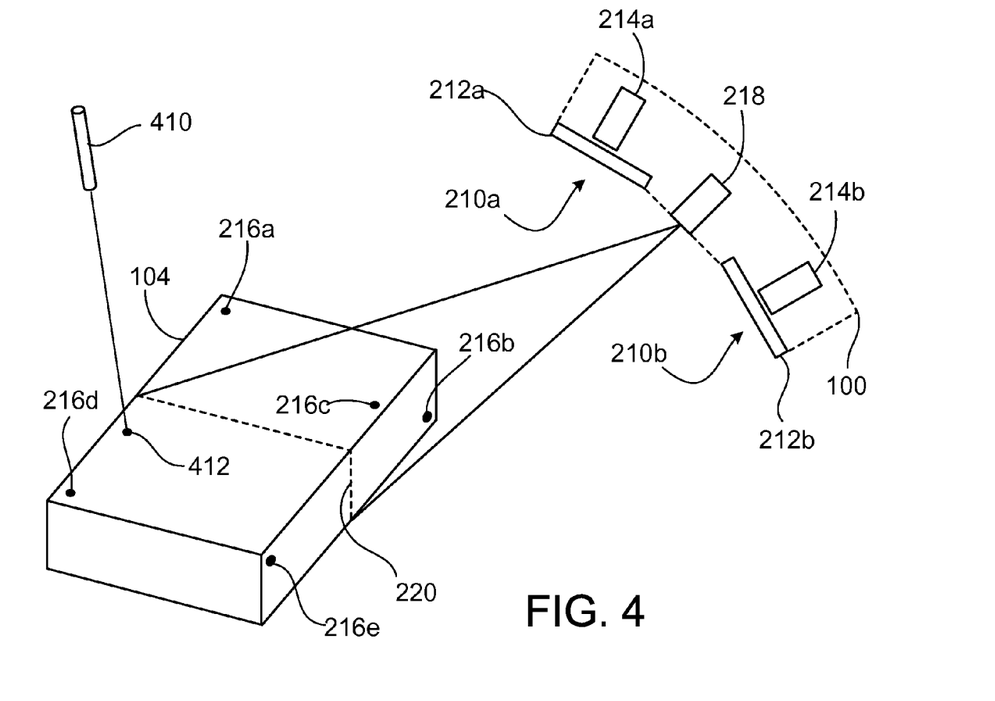
FIG. 4 is a schematic diagram of a self-referencing 3-D laser scanner and an external light source.

Referring to FIG. 4, other techniques may be used to provide location points on an object surface. For example, a directed light source (e.g., a hand-held laser pointer 410) may be used to identify one or more desired surface points. Various techniques may be used to provide the light source, for example, besides being a hand held device, light may be directed using a galvanometer, robot, or any other technique. In this particular arrangement shown in FIG. 4, a self-referencing 3-D measurement system (e.g., the 3-D laser scanner 100 and associated computer system) computes the 3-D position of the reflection 412 on the object surface using a triangulation technique similar to the methodology used to determine the position of the retro-reflective targets. Once determined, the 3-D position is provided to the computing device and used for processing (in a manner similar to the tip position for the probe 310). Additionally, when provided a proper signal, the computing device may record the position of the 3-D surface point for later use and computations.

In some arrangements, one or more processes such as a calibration process may be used for transforming the local coordinate system provided by a laser scanner into a coordinate system relative to the object under test. Initially, reference markers (e.g., such as the illustrated reference markers 216a-e) may be used by the laser scanner to establish a local coordinate system. Once the local coordinate system is determined, a calibration process may be used to establish a coordinate system relative to the object. For example, a probe (e.g., a tactile probe such as the probe 310 shown in FIG. 3) may be introduced and positioned on the surface of the object. Using this technique, the probe may or may not include reference markers. By adjusting the relative position and/or orientation of the probe (e.g., by pivoting the probe, changing the position of the laser scanner, etc.), position information may be collected to provide one or more reference points to transform the local coordinate system (e.g., of the 3-D laser scanner 100) into a predetermined coordinate system of the object 104. These techniques may also be implemented for determining one or more reference points. For example, one or more offsets may be determined for establishing reference points. In one arrangement, the tip of a probe (e.g., a tactile probe) could be attached to the self-referencing laser scanner (e.g., with a probe tip attachment). The probe tip may then be put in contact with the surface of the object and a measurement initiated (e.g., by a button being pressed). The offset to the tip of the attachment can be determined in various ways. Once known, the location of the probe in the local coordinate system can be computed and used in a manner similar to a separate probe.

In some implementations, a probe (e.g., the probe 310) may include a ball located at its tip (e.g., probe tip 314). A position measured at the probe tip may correspond to the center of the ball. In this example, the ball touches an object 104 at an edge of the ball, rather than the center of the ball. A measurement device can calculate the differential between the edge of the ball touching the object and the center of the ball indicating a measured position. The measurement device can then compensate for the differential to determine the location measured by the probe and probe tip.

Along with monitoring positions for one instance in time, the relative positions of the reference markers and the probe may be monitored over a period of time to provide additional information. For example, changes in the relative positions of the reference markers may indicate that the object is being deformed, e.g., possibly due to heat, stresses or other phenomena.

Some implementations use a probe 310 having reference markers similar to reference markers 216a-e of the object 104. In some examples, images can be obtained that include the reference markers of the probe and the reference markers of the object. In some examples, images can be obtained of the probe (e.g., if the probe includes active reference markers such as light-emitting markers), and separate images can be obtained of the reference markers 216a-e of the object 104. Images containing a profile of the object 104 (e.g., images containing an illuminated pattern 220) may or may not be obtained separately from images of the reference markers 216a-e or the probe 310.

Some implementations use a probe not having reference markers. In some examples, images containing a profile of the object 104 (e.g., images containing an illuminated pattern 220) may or may not be obtained separately from images containing the reference markers 216a-e of the object 104.

Data from the self-referencing 3-D laser scanner 100 can be provided to the computer system 112 by using one or more technologies. For example, wired connection techniques (e.g., USB, Ethernet, etc.) or wireless techniques (e.g., bluetooth, WiFi, wireless USB, etc.) may be used individually or in combination. Along with using computation resources that may be considered external to the self-referencing 3-D measurement system (e.g., a computer system external to the system), computational resources included in the measurement system may be used for the computations (or a portion of the computations), and vice-versa.

Figure 5:
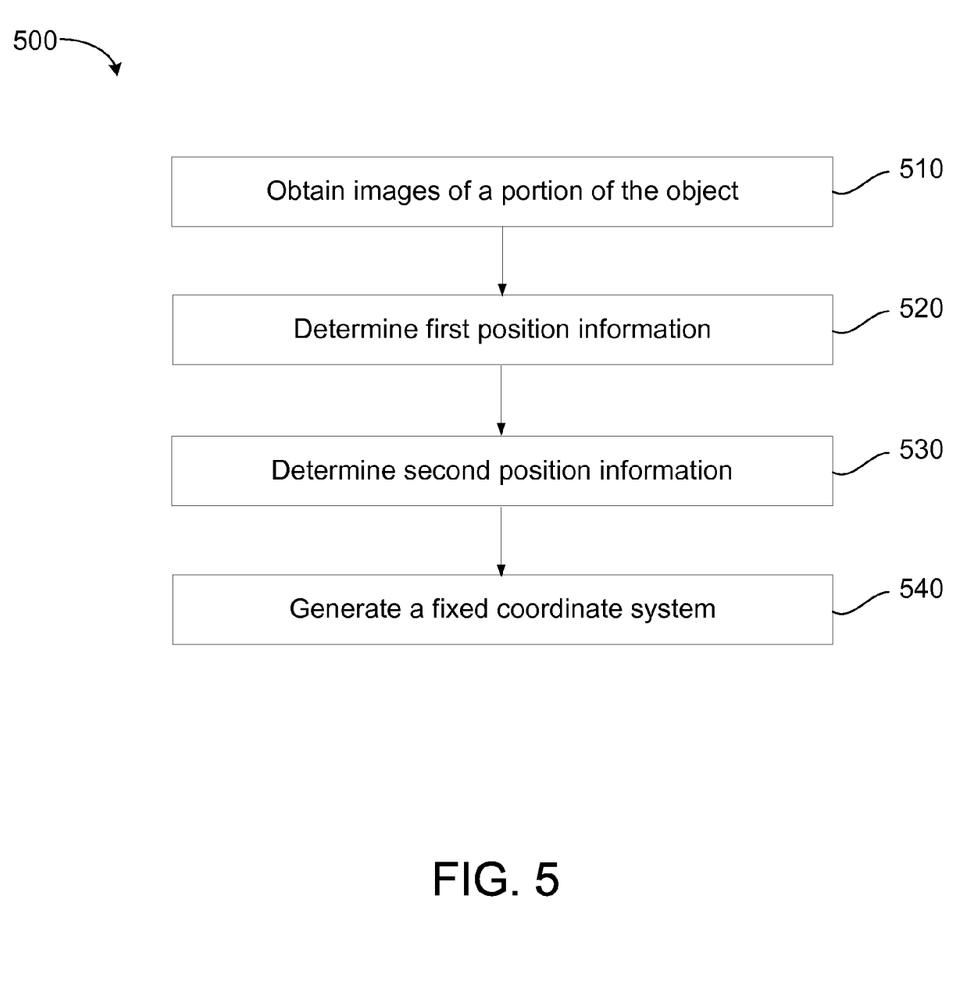
FIG. 5 is a flowchart for a self-referencing 3-D measurement process.

FIG. 5 shows an example process 500 for self-referencing 3-D measurement. The process 500 can be performed by a self-referencing 3-D measurement system, e.g., one containing a self-referencing 3-D laser scanner 100 and a computer system 112 as shown in FIG. 1. In step 510, the process illuminates a pattern on a surface of an object. For example, the pattern can be projected by the 3-D laser scanner 100. In step 520, the process obtains images of a portion of the object. Some of the images can include representations of one or more illuminated reference markers, e.g., reference markers 216a-e shown in FIGS. 2-4. In step 530, the process identifies a predetermined feature of the object. For example, the predetermined feature can be indicated by an instrument such as a probe. In step 540, the process determines first position information of the object, for example, position information associated with the illuminated reference markers represented in the images. In step 550, the process determines second position information, for example, position information of the predetermined feature of the object. In step 560, the process generates a mathematical transformation to convert from the fixed to a predetermined coordinate system defined relative the object and having a predetermined origin (e.g., an origin corresponding to the predetermined feature measured by the instrument, or an origin identified at an offset to the predetermined feature). This predetermined coordinate system is assigned, for example, in place of a local coordinate system oriented relative to the self-referencing 3-D measurement system. The process can assign the predetermined coordinate system based on the first position information and the second position information.

Figure 6:
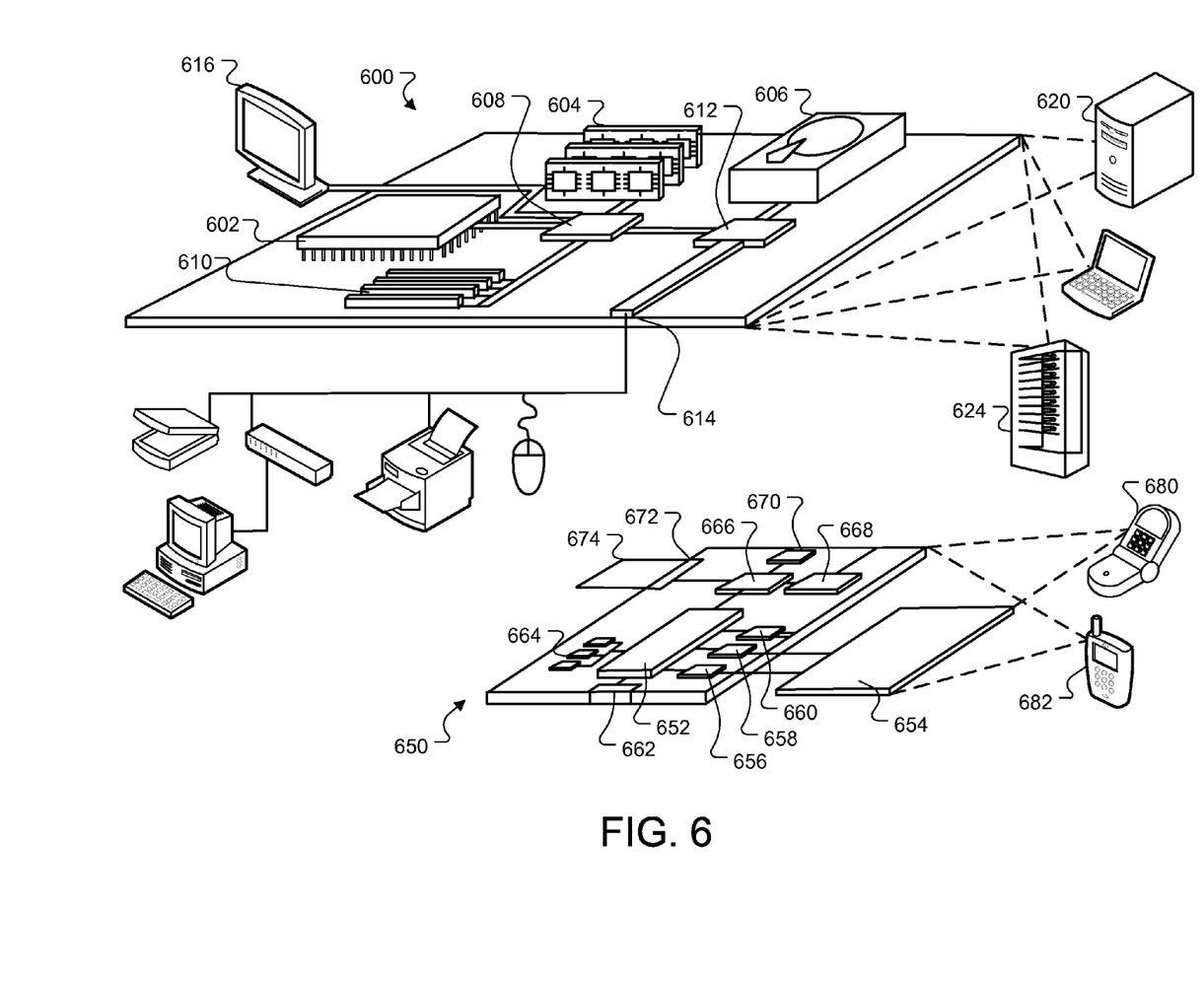
FIG. 6 is a block diagram of a computer system and associated components.

FIG. 6 shows an example of a computing device 600 and a mobile computing device 650 that can be used to implement the techniques described in this disclosure. For example, the computing device 600 could be the computer system 112 shown in FIG. 1. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a microdrive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Other embodiments are within the scope of the following claims. The techniques described herein can be performed in a different order and still achieve desirable results.

What is claimed is:

1. A measurement system comprising:
   a projector for illuminating a pattern on respective surfaces of instances of an object, the instances of the object sharing a specification;
   at least two imaging devices for obtaining images of a respective portion of each instance of the object, wherein at least some of the images include representations of one or more illuminated reference markers;
   an instrument for identifying a predetermined feature at least a portion of which is common to each instance of the object; and
   at least one processor configured for:
   determining, for each instance of the object, respective first position information associated with at least one of the illuminated reference markers represented in the images, determining second position information associated with the instrument, and assigning, for each instance of the object, a common predetermined object coordinate system, the assigning based on the determined first position information for that instance of the object and the determined second position information, predetermined object coordinate system having i) an origin defined by a predetermined position shared among the instances of the object and ii) a coordinate system orientation defined with respect to an orientation of each respective instance of the object, at least one instance of the object having an orientation relative to the projector that is different from the orientation relative to the projector of at least one other instance of the object, and the origin and coordinate system orientation of the predetermined object coordinate system being consistent among the instances of the object with respect to the respective instances of the object.

2. The system of claim 1 wherein the instrument comprises a tactile probe attachment for measuring an offset for establishing reference points.

3. The system of claim 1 wherein the instrument comprises a tactile probe, the tactile probe including reference markers.

4. The system of claim 3 wherein at least some of the images include representations of the reference markers of the tactile probe.

5. The system of claim 1 wherein the instrument comprises a directed light source for illuminating surfaces of instances of the object.

6. The system of claim 5 wherein the directed light source comprises a laser.

7. The measurement system of claim 1 wherein the origin of the predetermined object coordinate system with respect to each instance of the object is independent of a position or an orientation of the respective instance of the object.

8. The measurement system of claim 1 wherein the origin of the predetermined object coordinate system of the instances of the object is based on an existing computer model of the object.

9. The measurement system of claim 1 wherein the measurement system is configured to determine a local coordinate system that has coordinates, axes, and an origin that are oriented relative to the measurement system.

10. The measurement system of claim 9 wherein the predetermined coordinate object system of the instances of the object is independent of the local coordinate system.

11. The measurement system of claim 1 wherein the predetermined object coordinate system of the instances of the object has coordinates, axes, and an origin that are oriented relative to each respective instance of the object.

12. A measurement method comprising:
  illuminating a pattern on respective surfaces of instances of an object, the instances of the object sharing a specification;
  obtaining images of a respective portion of each instance of the object, wherein at least some of the images include representations of one or more illuminated reference markers;
  identifying a predetermined feature at least a portion of which is common to each instance of the object;
  determining, for each instance of the object, respective first position information associated with at least one of the illuminated reference markers represented in the images;
  determining second position information associated with the predetermined feature; and
  assigning, for each instance of the object, a common predetermined object coordinate system, the assigning based on the determined first position information for that instance of the object and the determined second position information,
  predetermined object coordinate system having i) an origin defined by a predetermined position shared among the instances of the object and ii) a coordinate system orientation defined with respect to an orientation of each respective instance of the object,
  at least one instance of the object having an orientation relative to the projector that is different from the orientation relative to the projector of at least one other instance of the object, and
  the origin and coordinate system orientation of the predetermined object coordinate system being consistent among the instances of the object with respect to the respective instances of the object.

13. The method of claim 12 comprising using the images to generate a computer model of one of the instances of the object based on a measured profile of the instance of the object.

14. The method of claim 13 comprising comparing the computer model to a reference model representing the object.

15. The method of claim 12 wherein at least one image includes the reference markers and at least one image is absent the reference markers.

16. The method of claim 12 wherein at least one image includes the reference markers and includes the illuminated pattern.

17. The method of claim 12 comprising determining the second position information when an instrument is placed at the predetermined feature.

18. The method of claim 12 comprising identifying the origin for the predetermined object coordinate system of the instances of the object based on a location of the predetermined feature of each respective instance of the object.

19. A computer program product residing on a computer readable memory device, the computer program product comprising instructions for causing a machine to:
  illuminate a pattern on respective surfaces of instances of an object, the instance of the object sharing a specification;
  obtain images of a respective portion of each instance of the object, wherein at least some of the images include representations of one or more illuminated reference markers;
  identify a predetermined feature at least a portion of which is common to each instance of the object;
  determine, for each instance of the object, respective first position information associated with at least one of the illuminated reference markers represented in the images;
  determine second position information associated with the predetermined feature; and
  assign, for each instance of the object, a common predetermined object coordinate system, the assigning based on the determined first position information for that instance of the object and the determined second position information,
  predetermined object coordinate system having i) an origin defined by a predetermined position shared among the instance of the object and ii) a coordinate system orientation defined with respect to an orientation of each respective instance of the object.

20. The computer program product of claim 19 comprising instructions for causing a machine to use the images to generate a computer model of one of the instances of the object based on a measured profile of the instance of the object.

21. The computer program product of claim 20 comprising instructions for causing a machine to compare the computer model to a reference model representing the object.

22. The computer program product of claim 19 wherein at least one image includes the reference markers and at least one image is absent the reference markers.

23. The computer program product of claim 19 wherein at least one image includes the reference markers and includes the illuminated pattern.

24. The computer program product of claim 19 comprising instructions for causing a machine to determine the second position information when an instrument is placed at the predetermined feature.

25. The computer program product of claim 19 comprising instructions for causing a machine to identify the origin for the predetermined object coordinate system with respect to each instance of the object based on a location of the predetermined feature of the respective instance of the object.

* * * * *